United States Patent [19]

Mouttet et al.

[11] 3,750,984
[45] Aug. 7, 1973

[54] MECHANICAL TRANSMISSION RELAY FOR A CONTROL FACILITY COMPRISING A MANUAL ELEMENT AND A SERVO-MOTOR, AND ITS USE IN AIRCRAFT CONTROL SYSTEMS

[75] Inventors: Henri Mouttet, Aix en Provence; Gerard Lafortune, Marignane, both of France

[73] Assignee: Societe Nationale Industrielle Aerospatiale, Paris, France

[22] Filed: May 11, 1972

[21] Appl. No.: 252,292

[30] Foreign Application Priority Data
May 18, 1971 France .............................. 7117933

[52] U.S. Cl. ................ 244/76 R, 74/469, 244/83 R
[51] Int. Cl. ............................................ B64c 13/18
[58] Field of Search .................. 244/78, 75 R, 76 R, 244/83 R; 74/469, 490; 114/144 R

[56] References Cited
UNITED STATES PATENTS

| 3,043,539 | 7/1962 | Bishop | 244/76 R |
| 3,096,045 | 7/1963 | Hendrickson et al. | 244/83 R X |
| 3,534,930 | 10/1970 | Garren, Jr. et al. | 244/76 R |

Primary Examiner—Milton Buchler
Assistant Examiner—Barry L. Kelmachter
Attorney—Karl W. Flocks et al.

[57] ABSTRACT

A relay, incorporated in a single box, and including a single torsion spring which provides a reaction force equal and opposite to forces applied to the relay so that play between the parts is eliminated. The relay is used in an aircraft control system, being connected by a link with a manual control element and a servo-motor. The servo-motor coacts with the relay and actuates a control surface of the aircraft. The relay includes a pivotable connecting link fixed to a pivot pin. The pivot pin is connected, through a quadrant which meshes with a pinion gear, to a shaft. The shaft carries a disc at one end. Movement of the shaft may be restricted by an electro-magnetic brake. The relay reacts to movement of either the manual control element or the central surface so as to provide a feel force for the pilot of the aircraft.

12 Claims, 6 Drawing Figures

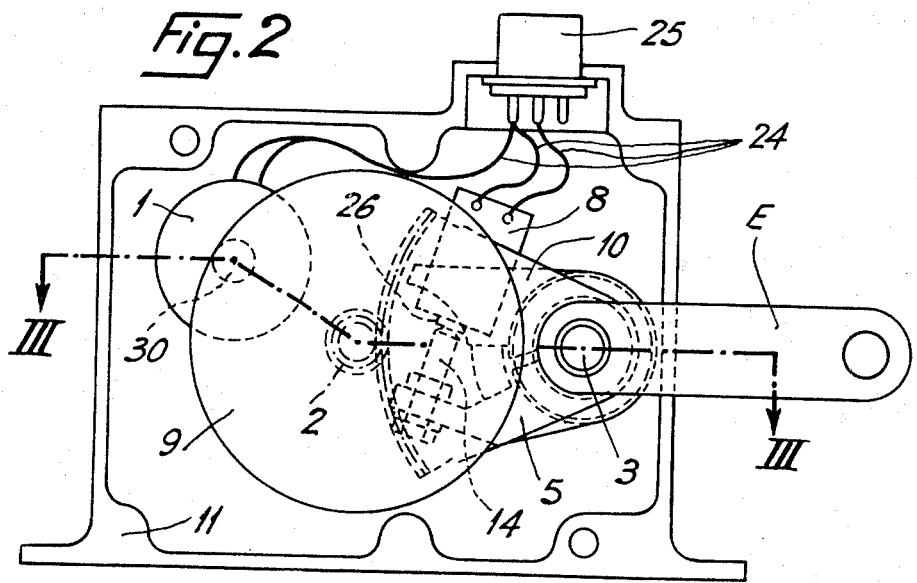
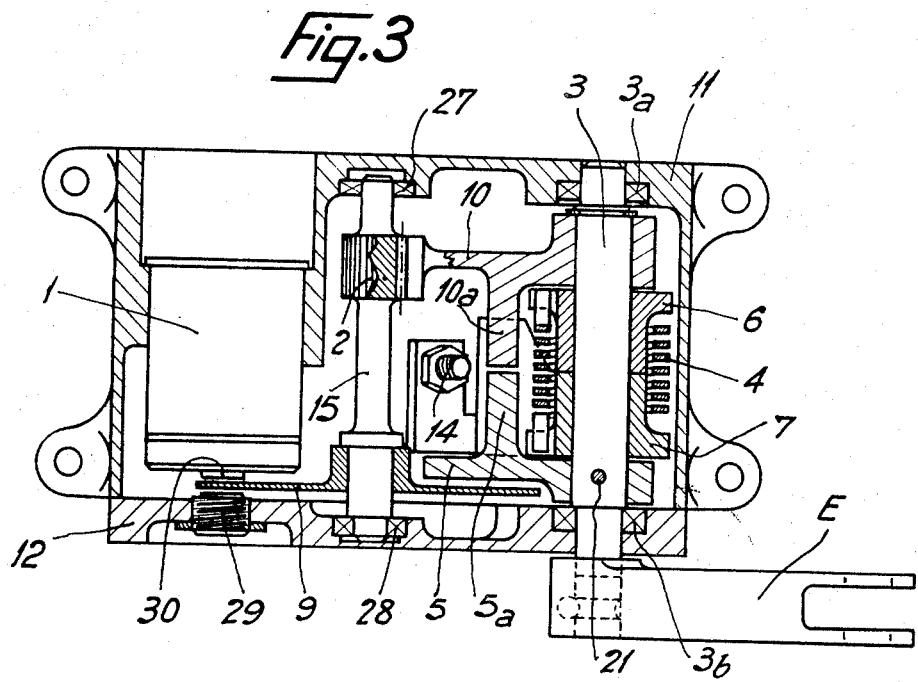

MECHANICAL TRANSMISSION RELAY FOR A CONTROL FACILITY COMPRISING A MANUAL ELEMENT AND A SERVO-MOTOR, AND ITS USE IN AIRCRAFT CONTROL SYSTEMS

This invention relates to a mechanical relay, of use in a mechanical transmission between a manual control element and a servo-motor which bears on the relay to act on the controlled element.

Through the agency of a relay of this kind, the controlled relay can be operated either by the servo-motor alone, the servo-motor bearing on the relay serving an anchorage, or voluntarily and manually with neutralization of the servo-motor either freely or against a resilient threshold force, or else a relay of this kind makes it possible to choose a mean position for the controlled element, around which position the manual control element and the servo-motor are operative.

The invention is of use more particularly for aircraft piloting, in particular for helicopters in which an automatic facility (an automatic pilot or a stability-boosting system) supplies information usable by the actuators for the control surfaces, while the pilot must always be able to provide arbitrary control of the craft by the manual control elements available to him and to select the mean trim position from which the automatic facilities just mentioned operate.

Relays of the kind specified are known wherein the linkage corresponding to a control element comprises a resilient part associated with amplitude-limiting contacts and an electromagnetic brake. Systems of this kind are unreliable and introduce systematic play into the linkage. Ball type locking devices for linkages are known, unlocking occurring when a critical force is exceeded, cancellation of locking being produced by an auxiliary mechanical control. Systems of this kind wear relatively quickly and, unless in proper working order, may lock the controls accidentally. Also, a locking system based on balls always suffers from play, since each ball must be mounted in its receiving element with tolerances.

This invention obviates these disadvantages and has the following advantages:

It combines into a single closed-box type facility the resilient device determining the reaction force pattern and the servo-motor anchorage facility, thus facilitating sitting and improving component reliability. The invention makes it possible to provide the reaction force pattern by means of a single resilient torsion restoring spring, so that the forces can be symmetrical around zero and no play is introduced. The invention also provides the possibility of using in parallel with the spring a contact enabling the automatic pilot or automatic stabilizer to provide "transparent piloting"; since the contact cancels the action of the servo-motor of the control, piloting becomes manual and the reaction felt by the pilot is the reaction provided by the restoring or return spring on either side of the mean position of the control. According to another feature of the invention, if the system also comprises an electric motor and a clutch, the control can either be offset at an appropriate speed ("beep trim" control") or be fully released for manual piloting.

According to the main feature of the invention, the relay comprises a pivoted link which is connected to a controlled position-locking device by way of a connection comprising a bilateral resilient force limiter. Preferably, the pivoted link is rigidly secured to a finger which extends parallel to the pivot axis of the link and which is normally disposed in extension of a second finger rigidly secured to the locking device, the two fingers being engaged between the two jaws of a spring-loaded gripper, the jaws being pivotable around the link axis.

Advantageously, the spring is a helical torsion spring whose axis coincides with the axis of the pivoted link.

Preferably, the locking means comprise a quadrant pivoting around the link axis; advantageously, for improved accuracy of quadrant positioning the quadrant is toothed and meshes with a pinion on a second shaft on which the controlled locking means are operative. The latter means can be electromagnetically operated and can act on a disc rigidly secured to the second shaft. The locking means can be secured in position by acting through the agency of a motor which drives the second shaft when the same has been released from the action of the controlled locking means.

The remainder of the description given hereinafter, taken together with the accompanying drawings, will show clearly how the invention can be carried into practice. In the drawings:

FIG. 2 is an elevation of a device according to the invention when open;

FIG. 3 is a section on the line III—III of FIG. 2;

Figure 1:
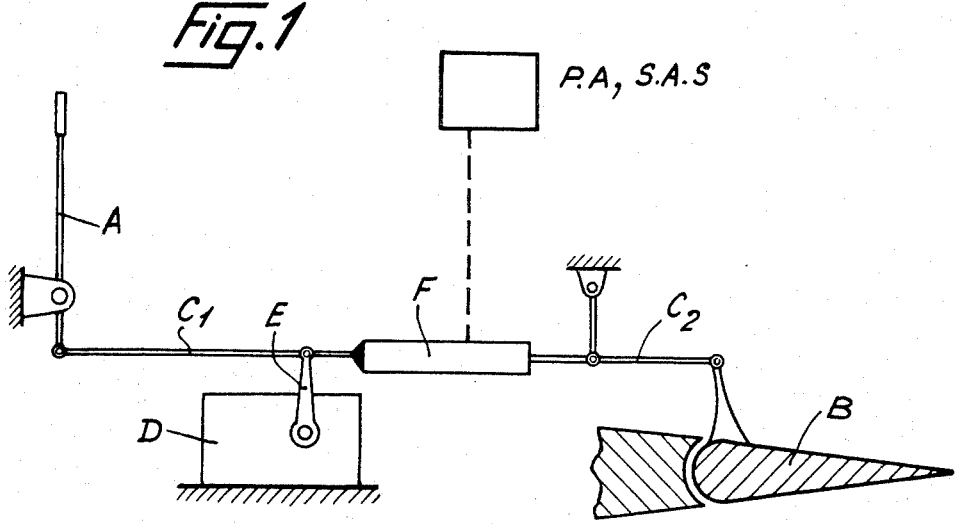
FIG. 1 is a diagrammatic view of an aircraft piloting control system comprising a relay according to the invention.

In the embodiment shown in FIG. 1, a manual control element A, such as a control stick or a rudder bar, is connected by a two-part linkage $C_1$, $C_2$ to a control surface B. A mechanical relay D according to the invention is disposed between the two linkage parts or sections $C_1$, $C_2$ and is mechanically connected to the linkage by a pivoted link E. Also provided is a reciprocating actuator type servo-motor F under the control of an automatic pilot P.A. or in the case of a helicopter of a stability-boosting system S.A.S.

The function of relay D and link E in automatic operation is to provide a bearing position for the servo-motor to act on the surface B yet to enable the same to be controlled manually by the element A by way of the locked and inoperative actuator F. In the latter case, the relay D makes this manual control possibly either freely — i.e., with the only reactions on the control being the aerodynamic reactions of the control surface — or against a resilient force providing a particular reaction force pattern on the control element (transparent piloting) and tending to return the control A and therefore the control surface B to a predetermined mean position.

Figure 5:
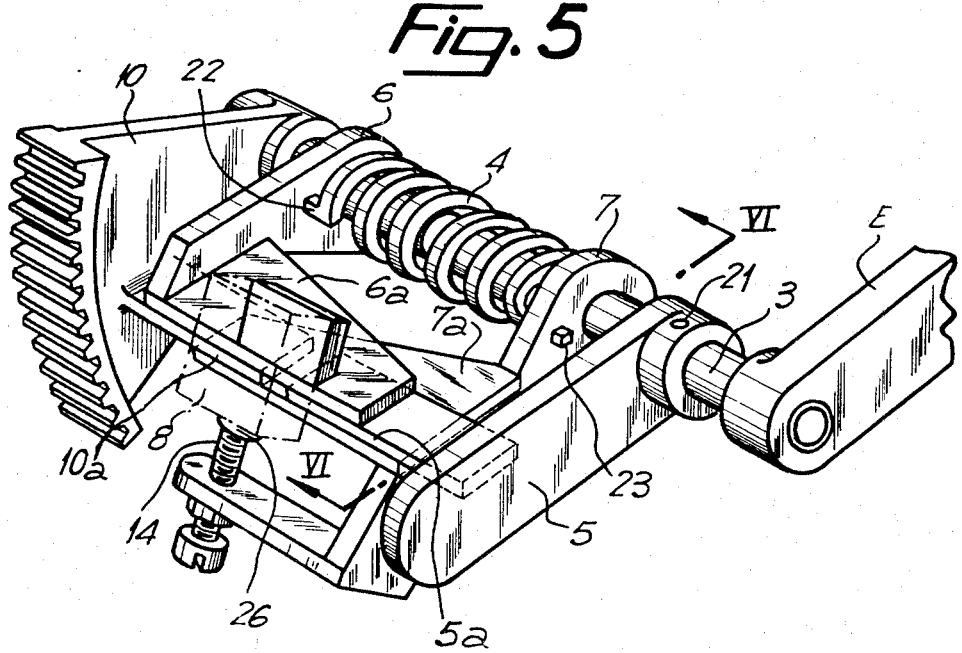
FIG. 5 is a diagrammatic perspective view of the bilateral force-limiting facility.
Figure 6:
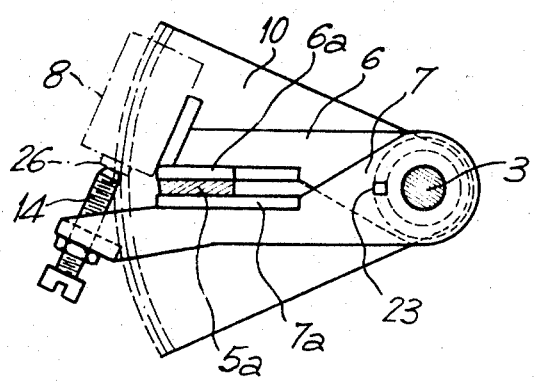
FIG. 6 is a section on the line VI—VI of FIG. 5.

The relay D can accordingly be devised as shown in FIGS. 2 and 3. Link E is rigidly secured to a shaft 3 rotating freely in bearings 3a, 3b mounted in a box 11 and a plate 12 closing the same. A pin 21 secures shaft 3 rigidly to a lever 5 which can also be seen in FIG. 5 and which bears a flat finger 5a parallel to the shaft 3. Rotating freely thereon is a quadrant rack 10 which has a finger 10a disposed opposite the finger 5a. The fingers 5a, 10a are gripped between plate-like jaws 6a, 7a rigidly secured to gripper arms 6, 7 respectively; the same can rotate freely on the shaft 3 but are interconnected by a helical torsion spring 4; the ends thereof are disposed parallel to the shaft 3 and engage in apertures 22, 23 in the gripper arms 6, 7 respectively.

The jaws 6a, 7a therefore keep the fingers 5a, 10a in alignment with one another — i.e., they rigidly connect the lever 5 to the quadrant rack 10 for such forces acting on the integers 5, 10 as are less than the resilient torque provided by spring 4. If the latter torque is exceeded by action on link E to either hand, the fingers 5a, 10a cease to be aligned with one another and the jaws 6a, 7a move apart from one another.

Gripper arm 6 bears a contact element 8 connected to the automatic pilot facility (P.A. or S.A.S.) by way of flexible wires 24 and a connector disposed on casing 11. Gripper arm 7 bears an adjustable needle screw 14 which extends towards rod 26 of contact 8, so that integer 14 acts on integer 26 when the fingers 5a, 10a are in alignment with one another — i.e., when the gripper jaws 6a, 7a are clamped. Consequently, by way of contact 8 the automatic pilot or stability booster, which is operative when the jaws are near one another, becomes inoperative when the jaws move away from one another — i.e., the actuator F becomes a purely passive element in the complete linkage.

Quadrant rack 10 meshes with a pinion 2 rigidly secured to a second shaft 15 on which a brake disc 9 is secured. Shaft 15 can rotate freely in bearings 27, 28 in casing 11 and plate 12 respectively.

A peripheral portion of disc 9 is disposed between two brake pads 29, 30, pad 29 being stationary and rigidly secured to plate 12 whereas pad 30 is in the known system 1 disposed on a spring-biased sliding bearing — so that disc 9 is braked — and is rigidly secured to a ferromagnetic core. To release disc 9, the core can be operated by a solenoid (not shown) energized by way of a contactor outside the system and by way of the connector 25. When the solenoid is operative the brake pad 30 is clear of the disc 9 and the same is free to rotate.

Figure 4:
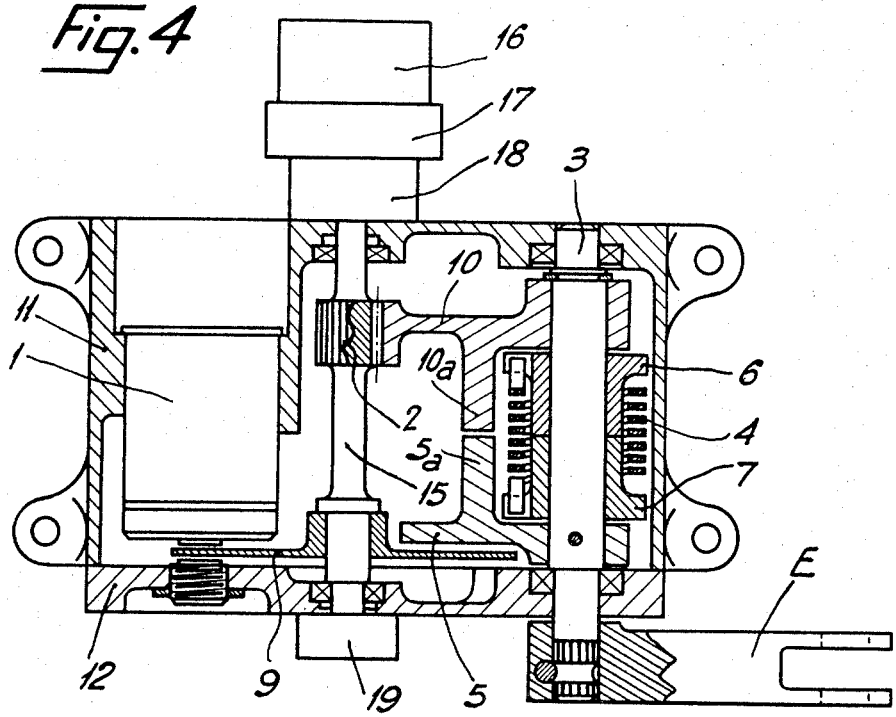
FIG. 4 is a view in section similar to FIG. 3 of an alternative.

As shown in FIG. 4, the facility shown in FIGS. 2 and 3 can further comprise an electric motor 16 adapted to drive shaft 15 by way of a reducer 17 and a clutch 18. These three elements are stacked together and the shaft 15 is rigidly secured to the output of clutch 18. The motor 16 provides automatic or controlled recentering of the control.

If, for instance, weather conditions alter in flight or if the aircraft attitude needs altering, the movement of the actuator F may not be enough on one side to maintain the aircraft in the required conditions. It then becomes necessary to offset or shift the link E which forms the actuator anchorage position. This operation can be performed by the motor 16, which is then controlled either by the automatic piloting facility P.A. or S.A.S. or by the pilot, by way of a switch in the motor supply circuit.

When the control is operated by the automatic pilot facility, the circuits thereof must be informed about the position of the link E. Accordingly, a position-repeating potentiometer 19 is provided in the system and is disposed on the end plate 12 in association with the end of shaft 15, which is rigidly secured to the potentiometer slider 19.

In the absence of motor 16, there are two possible forms of operation — brake on or brake off.

To release the brake the solenoid of the system 1 is energised continuously, so that shaft 3 drives shaft 15 freely by way of the fingers 5a, 10a which rotate solidly because of the gripper device 6,7. The aircraft can then be piloted manually, the system according to the invention remaining inoperative.

If the solenoid is not energized, the brake is on — i.e., the pads 29, 30 lock the disc 9. Link E is then kept stationary and, provided that a force less than the torque applied to the fingers 5a, and 10a by the gripper arms 6, 7 is not applied to the link E, the same serves as anchorage point for the actuator F.

Consequently, if the pilot wishes to resume control or pilots through the navigation facility, operation of the control column A by initially applying to it a torque greater than the torque of the spring 4 separates the gripper jaws from one another, for one jaw bears on the finger 10a locked by the brake and the other jaw is therefore moved by the finger 5a, so that the contact 8 cuts out the navigation facility. The contact 8 can cause the actuator to return to its fixed mean position. The pilot therefore acts alone thereafter on the control, overcoming the force of the spring 4. When he releases the control the link E is returned to its initial position by the spring 4, the contact 8 operates and the navigation device cuts in again.

The pilot can also recenter the control while keeping the element A in a new position, then operating the solenoid 1 (sic) which releases the brake. The shaft 15 moves into a new angular position and the fingers 5a, 10a resume their position opposite one another. The pilot then switches off the solenoid 1, the brake goes on again and the link E is anchored in its new position. The automatic navigation facility cuts in again since the contact 8 is operated again.

The system shown in FIG. 4 provides the same possibilities when the clutch 18 is released and the brake is on or off, but the motor 16 makes automatic trim control possible by the automatic pilot facility or, where applicable, by manual control through the agency of contactors operated by the pilot in the following order — engagement of clutch 18, release of brake by energization of the solenoid of the element 1, and energization of motor 16. The function of the clutch 18 is to obviate any passive resistance in the control linkage in the case of manual piloting and to protect the motor when, after the same has carried out a control recentering operation, the brake goes on again and locks the rotating shaft 15. Also, declutching the motor when the required position has been reached gives improved control accuracy by cutting out motor inertia effects.

This invention is of use in all cases in which a mechanical control comprises a feature whose operation can be replaceable at any time by a manual operation and whose initial position may need subsequent automatic or manual re-adjustment. The invention is therefore of use in particular for aircraft piloting control systems, more particularly for a helicopter piloting control system comprising an automatic pilot or a known stability-boosting system.

I claim:

1. In a mechanical control system for actuating a controlled element, the mechanical control system comprising a manual control element and a mechanical transmission which interconnects the manual control element and the controlled element, the mechanical transmission including a servo-motor for actuating the controlled element independently of the manual control element; there is provided a mechanical relay between the manual control element and the servo-motor, the relay providing a reaction for the servo-motor, to enable the servo-motor to actuate the controlled element while permitting the manual control element to act through the servo-motor to actuate the controlled element; wherein the improvement comprises the mechanical relay comprising a pivot pin; a link pivotable with said pivot pin; means articulating said link to the transmission means; means connecting said link to means locking said link in a predetermined position; and resilient means coupled with said link and arranged to oppose a force applied to move said link about said pivot pin.

2. The improvement according to claim 1, wherein said pivot pin is fixed to a finger extending parallel to the pivot axis of said link, said finger being normally disposed along an extension of a second finger connected to said locking means, said two fingers being engaged between two jaws of a spring-loaded gripper, said jaws being pivotable around the link axis.

3. The improvement according to claim 2, wherein said resilient means comprise a helical spring, extending coaxially of the link axis, each end of said spring cooperative with one jaw of the gripper in the clamping direction of the jaws.

4. The improvement according to claim 2, wherein said gripper jaws act on electric contact means in a control circuit for said servo-motor.

5. The improvement according to claim 1, wherein said locking means comprise a quadrant rack pivotable around said link axis, said rack being in mesh with a pinion mounted on a shaft, said locking means acting on said shaft.

6. The improvement according to claim 5, wherein said shaft has a disc mounted thereon, said disc being adapted to be clamped on its periphery to be locked in position by electromagnetic means operating against a resilient force.

7. The improvement according to claim 6, wherein said shaft is rotated by a motor through a clutch permitting said shaft to be rotationally located relative to said electromagnetic means.

8. The improvement according to claim 7 wherein said shaft comprises means for repeating an angular position relative to said electromagnetic means.

9. The improvement according to claim 8 wherein said repeater means transmit a signal to a remote control means of said motor.

10. An aircraft control system for actuating a control surface, the system comprising a manual control element and a mechanical transmission, which interconnects the manual control element and the control surface, a servo-motor for actuating the control surface independently of the manual control element automatic aircraft control means for controlling the servo-motor, a relay providing a reaction for the servo-motor to enable the servo-motor to actuate the control surface while permitting the manual control element to act through the servo-motor to actuate the control surface, said relay comprising a pivot pin; a link pivotable with said pivot pin; means articulating said link to the transmission means; means connecting said link to means locking said link in a predetermined position; and resilient means coupled with said link and arranged to oppose a force applied to move said link about said pivot pin.

11. The aircraft control system according to claim 10 wherein said automatic aircraft control means comprises an automatic pilot facility.

12. The aircraft control system according to claim 10 wherein said automatic aircraft control means comprises a stability boosting system.

* * * * *